(12) United States Patent
Dhandhania et al.

(10) Patent No.: US 11,743,362 B1
(45) Date of Patent: Aug. 29, 2023

(54) PROFILES AS A SERVICE

(71) Applicant: Amazon Technologies, Inc., Seattle, WA (US)

(72) Inventors: Arpit Dhandhania, Bangalore (IN); Sagar Sharma, Kolkata (IN); Shaleen Kumar Sharma, Bengaluru (IN); Shubham Srivastava, Bangalore (IN); Subhasish Kundu, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/957,556

(22) Filed: Sep. 30, 2022

(51) Int. Cl.
 *H04L 67/60* (2022.01)
(52) U.S. Cl.
 CPC .................. *H04L 67/60* (2022.05)
(58) Field of Classification Search
 CPC ......... H04L 67/60; H04L 67/75; H04L 69/00; H04L 69/085; H04L 69/163; H04L 69/64
 See application file for complete search history.

(56) References Cited

U.S. PATENT DOCUMENTS

| | | | | |
|---|---|---|---|---|
| 8,775,553 | B2* | 7/2014 | Cansino | H04N 21/23103 709/227 |
| 9,405,827 | B2* | 8/2016 | Fischer | H04L 51/02 |
| 10,148,786 | B1* | 12/2018 | Beaty | H04L 63/0823 |
| 2019/0312879 | A1* | 10/2019 | Agrawal | H04L 63/12 |
| 2020/0104846 | A1* | 4/2020 | Singhal | H04L 63/083 |
| 2021/0084032 | A1* | 3/2021 | Ding | G06F 9/54 |
| 2021/0399892 | A1* | 12/2021 | Bankston | G06Q 20/4014 |
| 2022/0067690 | A1* | 3/2022 | Nair | G06Q 20/40 |

* cited by examiner

*Primary Examiner* — Michael A Keller
*Assistant Examiner* — Thao D Duong
(74) *Attorney, Agent, or Firm* — Kilpatrick Townsend & Stockton LLP

(57) ABSTRACT

Providing a profile as a service is described herein. In an example, a computer system of stores account information for an account with a first service provider and profile information of a profile of the account. The computer system stores access control information that controls access to the account information and the profile information. The computer system receives an information request of a second service provider and determines, based at least in part on the access control information, a permission for the second service provider to access at least a portion of the profile information. The computer system sends, to the second service provider, the portion of the profile information in a response to the information request.

20 Claims, 11 Drawing Sheets

PROFILES AS A SERVICE

BACKGROUND

Various service providers provide accounts with multiple profiles for different users associated with the account. Some information, such as subscription information, can be shared between the profiles, but the profiles can also allow for customization for each of the users. For example, an account for a streaming service can include multiple profiles for users of a same household so that each user can access the streaming service and so that the streaming service is customized to each user according to their profile.

BRIEF DESCRIPTION OF THE DRAWINGS

Various embodiments in accordance with the present disclosure will be described with reference to the drawings, in which.

DETAILED DESCRIPTION

Figure 1:
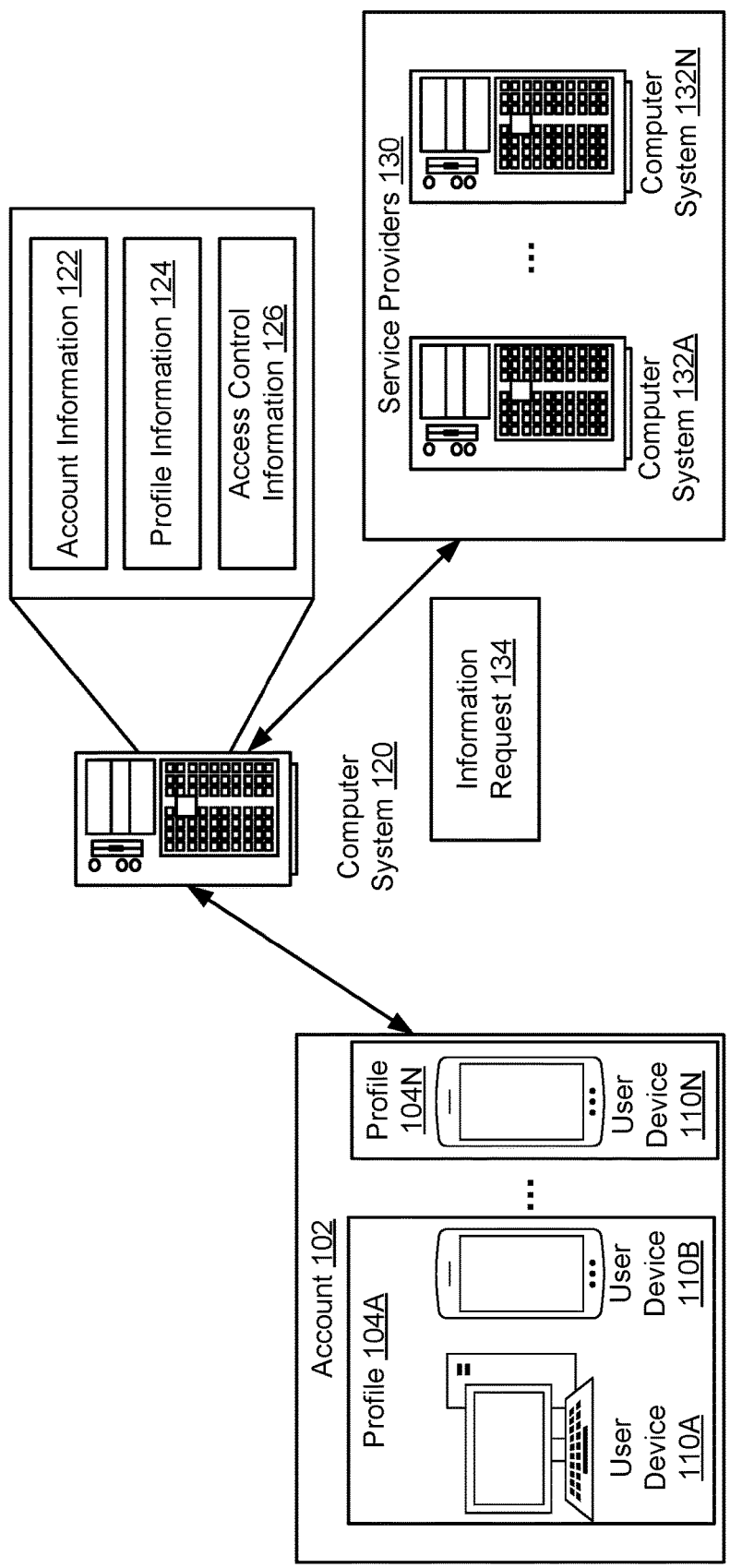
FIG. 1 illustrates an example of a system for implementing a profile as a service according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, sharing profile information for accounts across various service providers. In an example, a computer system of a first service provider (e.g., online marketplace service, streaming service, medical service, etc.) stores account information for an account with the first service provider and profile information (e.g., subscription information, profile name, historical information, etc.) of a profile of the account. The computer system can store access control information that controls access to the account information and the profile information. The computer system receives an information request of a second computer system of a second service provider (e.g., via an application programming interface (API) call from the second computer system) and determines, based on the access control information, a permission for the second service provider to access at least a portion of the profile information. The computer system sends, to the second computer system, the portion of the profile information in a response to the information request (e.g., in an API response).

To illustrate, consider an online marketplace that offers items for purchase to users. A user can initiate a creation of an account with the online marketplace by sending a request to another service provider, such as a streaming service. A computer system of the streaming service can send an API call to a computer system of the online marketplace indicating an account identifier for the account and a profile of the account. The online marketplace can then generate the account and store account and profile information. The streaming service may additionally send a second API call to request profile information about the account from the online marketplace. The online marketplace can verify that the streaming service has permission to the requested profile information, and upon determining that the streaming service does have permission, the online marketplace can send the profile information via an API response. Additional API calls may be made from the streaming service to the online marketplace if a user updates their subscription with the streaming service or to validate the subscription if the user requests to use the subscription. As such, multiple APIs are provided to share profile information for an account between service providers.

Embodiments of the present disclosure may provide technical improvements over conventional techniques for storing profile information for an account. For example, this technique may allow a user to create an account one time with a service provider operating a computer system. The computer system can then share the account information with multiple computer systems of multiple service providers. As such, user experience for various service providers can be improved, whereby access to online services provided by the computer systems can be managed based on the shared account information. In addition, the information sharing can be secure, whereby particular account access rights can be set-up and used prior to and after the account information is shared. By acting as a central repository of the account information, updates to the account information need only to be managed by the computer system, thereby avoiding redundance updates and, possibly, inconsistent updates across the different computer systems.

Different use cases of a profile as a service are possible and are supported by the embodiments of the present disclosure. In an example, a computer system of a first service provider may manage a group account for a group of users (e.g., a household, a company, an organization, etc.), where the group account may include individual accounts (or profiles) each corresponding to a user. Access control information can be defined to specify how group account information and/or individual account information can be shared with computer systems of other service providers. The group account and/or each individual account can be generated by the computer system of the service provider and/or by another computer system of another service provider.

In a first illustrative use case, a household account is generated and includes profiles of family members. This household account is used to access a first online service of a service provider (e.g., an online marketplace service). A family member may sign up for a second online service of a second service provider (e.g., to a movie streaming service). Given access control permissions as set in the household account, the household account information and the profile information can be shared with the second online service.

In a second illustrative use case, an employer account is generated and includes profiles of employees. The profiles are used to access a first online service of a service provider (e.g., a set of work-related online tools). An authorized employee may sign up a subset of the employees for a second online service of a second service provider (e.g., for an online training). Given access control permissions as set in the employer account, the profile information of only the subset of employees can be shared with the second online service such that only these employees can have access to the second online service.

In a third illustrative use case, a personal account is generated for an individual and includes an insurance profile. The profile is used for medical benefits from a first service provider. The individual may decide to sign up for medical benefits of a second service provider. Given access control permissions as set in the personal account, the profile information can be shared with the second service provider and previous access by the first service provider to the profile information can be terminated.

FIG. 1 illustrates an example of a system for implementing a profile as a service according to an embodiment of the present disclosure. The system includes a computer system 120 that is associated with a first service provider that communicates with user devices 110A-N associated with profiles 104A-N of an account 102 and computer systems 132A-N of additional service providers 130 (e.g., media content providers, other online marketplaces, etc.). As illustrated, user devices 110A-B are associated with profile 104A of the account 102 and user device 110N is associated with profile 104N of the account 102.

A user associated with the account 102 can create the account 102 with the first service provider. For instance, a user may have used a user device associated with the account 102, such as user device 110A, to create the account 102 with the first service provider. To create the account 102, the user device 110A may send a request for an account creation to a computer system 132A that is associated with a second service provider. The computer system 132A can then send an application programming interface (API) call to the computer system 120 with an account identifier of the account 102 and a default profile (e.g., profile 104A) for the account 102. The computer system 120 generates the account 102 based on the API call by storing the account identifier in account information 122. The computer system 120 also sets the profile 104A as the default profile. The profile 104A can be created in a particular format and stored according to a standard. The standardization can simplify how fields of the profile 104A are requested and served. The account information 122 may include multiple profiles, where each of the profiles is associated with a different user of the account 102. The profiles 104A-N may be created with different service providers 130. So, the profile 140A can be created by the computer system 132A associated with the second service provider, and the profile 104N can be created by the computer system 132N of a third service provider.

In an example, the computer system 120 stores profile information 124 of each profile 104A-N of the account 102. The profile information 124 can include information associated with the first service provider (e.g., a shared benefit) and information associated with the second service provider (e.g., an account therewith, a subscription therewith, etc.). The computer system 120 also stores access control information 126 that controls access to the account information 122 and the profile information 124. The access control information 126 can be used to determine whether the second service provider has permission to access some or all of the profile information 124 when an information request 134 of the computer system 132A is received via an API. The information request 134 can include a profile identifier of the profile that the computer system 132A is attempting to access. Based on the access control information 126, the computer system 120 can provide an API response to the computer system 132A. For example, the computer system 120 may send account information for an account of the user with the second service provider to the computer system 132A. Or, the computer system 120 may send subscription information for a subscription of the user with the second service provider to the computer system 132A.

In an example, the access control information 126 may indicate that particular metadata is sharable for the user with the second service provider. In this case, the computer system 120 can send profile information 124 including the particular metadata via an API response to the computer system 132A. In addition, if the profile information 124 includes information associated with multiple profiles 104A-N, the access control information 126 can indicate that metadata for a first profile (e.g., profile 104A) is sharable with the second service provider (e.g., computer system 132A) and that metadata for a second profile (e.g., profile 104N) is not sharable with the second service provider. The profile information 124 may be organized into logical groups, with each logical group being associated with an access level. So, the computer system 120 can associate first metadata of the account 102 or the profile 104A with a first access control permission and second metadata of the profile 104A with a second access control permission. The computer system 120 determines that the access control information 126 indicates the second access control permission for the computer system 132A and includes the second metadata and not the first metadata of the profile information 124 in the API response to the computer system 132A. At an account level, the access control information 126 may indicate a first access control permission that is different than a second access control permission at a profile level. So, the profile information 124 that is sent to the computer system 132A can be based on the second access control permission. As such, at least a portion of the profile information 124 for the account 102 can be shared to service providers 130 so that the user can create the account 102 with profiles 104A-N once and use the account 102 across multiple service providers.

In an example, the storage of the account information 122, the profile information 124, and the access control information 126 may be decentralized. That is, rather than the computer system 120 storing some or all of the information, a remote storage accessible by the computer system 120 and the computer systems 132A-N may store the account information 122, the profile information 124, and the access control information 126. The decentralized system may include multiple servers that store the information. For instance, a first server may store the account information 122, a second server may store the profile information 124, and a third server may store the access control information 126. In another illustration, a first server may store the account information 122 and the profile information 124, whereas a second server may store the access control information 126. Further, the decentralized system can support redundancy of services and/or information. For instance, more than one server can store each of the account information 122, the profile information 124, and the access control information 126. As such, if one server fails, the information can still be accessed from another server storing the same information.

Figure 2:
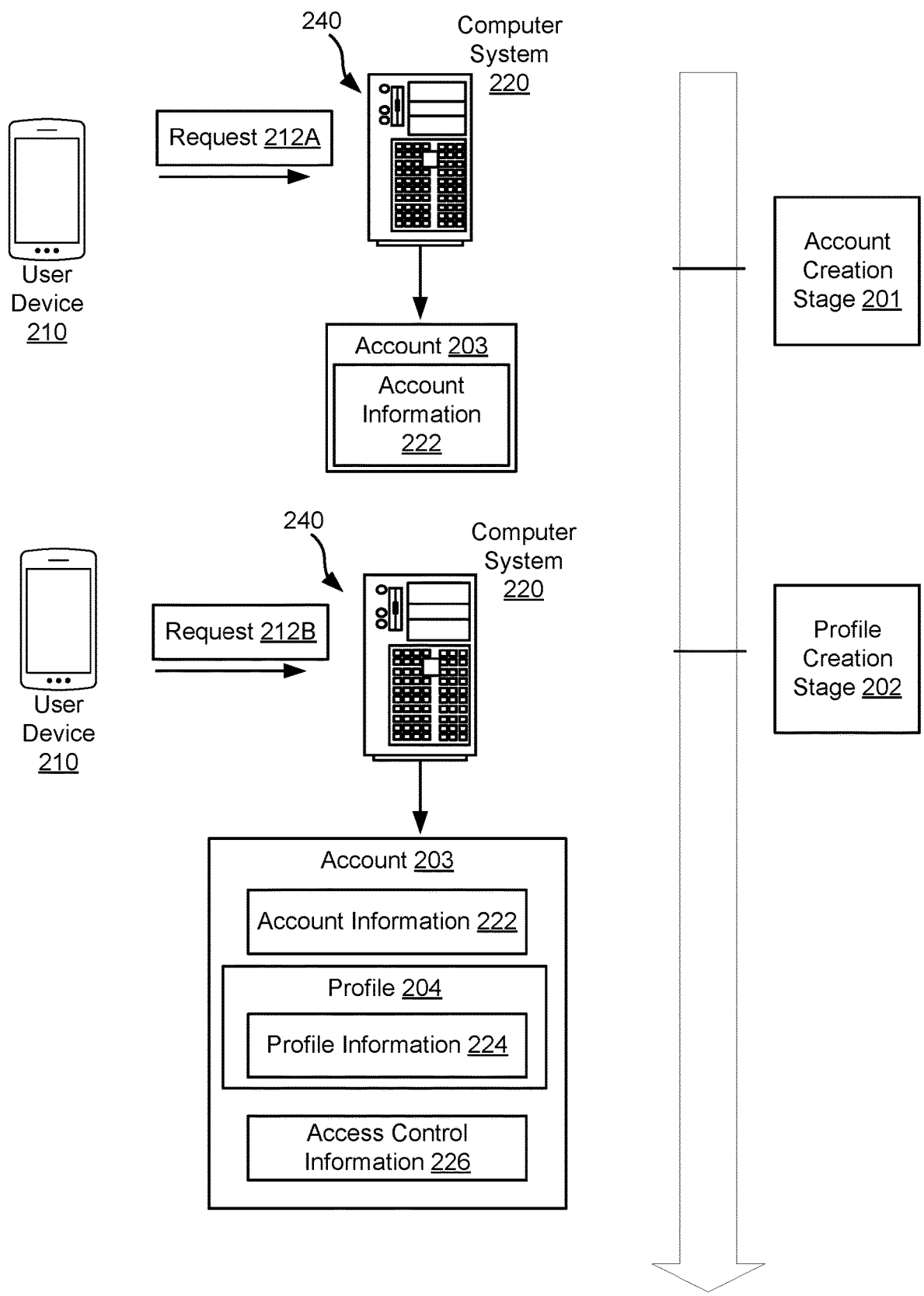
FIG. 2 illustrates stages of creating an account and profiles using a user device according to an embodiment of the present disclosure.

FIG. 2 illustrates stages of creating an account and profiles using a user device according to an embodiment of the present disclosure. In an example, the stages include an account creation stage 201 and a profile creation stage 202.

During the account creation stage 201, a user can use a user device 210 to access a website associated with a service provider 240. The user device 210 can send a request 212A to create an account 203 to a computer system 220 associated with the service provider 240. In response, the computer system 220 can generate the account 203. The computer system 220 stores account information 222 for the account 203, which can include an account identifier, an association of the user device 210 and a device identifier, and other suitable information about the account 203.

In an example, the profile creation stage 202 involves creating one or more profiles for the account 203. The user may use the user device 210 to create the one or more profiles. For instance, the user device 210 may send a request 212B for creating a profile 204 via a website of the service provider 240. The computer system 220 generates the profile 204 based on the request 212B. The computer system 220 can store profile information 224 for the profile 204 that includes first profile information associated with the service provider 240 and second profile information associated with another service provider, subscription information of a subscription of the user with another service provider, and/or information of another account of the user with another service provider. The user device 210 may indicate multiple users associated with the account 203, and the computer system 220 can generate a profile and associated profile information for each user of the account 203.

The profile creation stage 202 can also involve the computer system 220 storing access control information 226 for controlling access to the account information 222 and the profile information 224. The access control information 226 may be provided by the user via the user device 210, by the service provider 240, or by another entity. So, upon another service provider requesting information about the account 203 or the profile 204, the computer system 220 can check the access control information 226 to determine whether the other service provider has permission to access the account 203 or the profile 204.

Figure 3:
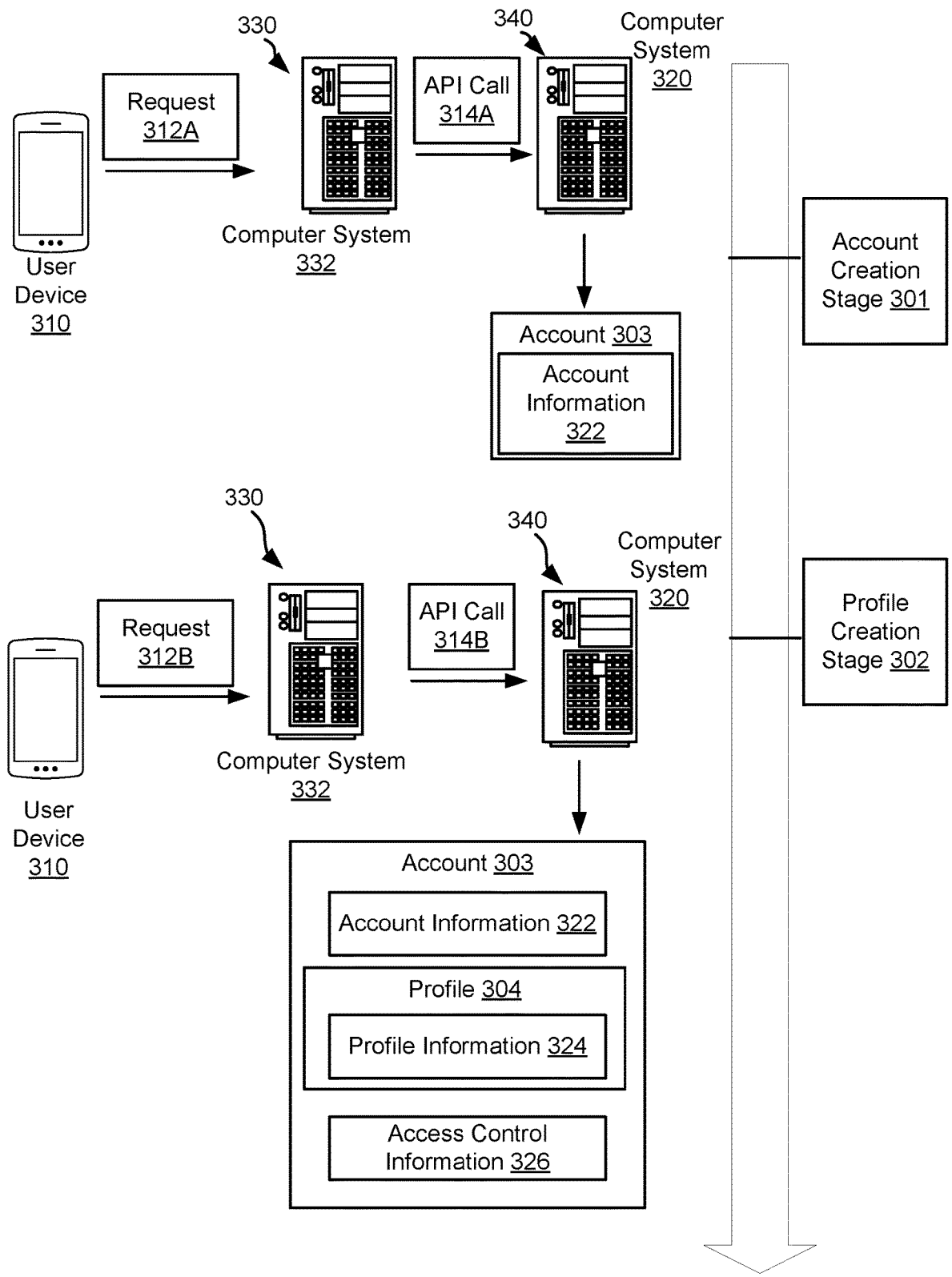
FIG. 3 illustrates stages of creating an account and profiles for a first service provider using a second service provider website according to an embodiment of the present disclosure.

FIG. 3 illustrates stages of creating an account and profiles for a first service provider using a second service provider website according to an embodiment of the present disclosure. In an example, the stages include an account creation stage 301 and a profile creation stage 302.

During the account creation stage 301, a user can use a user device 310 to access a website associated with a service provider 330. The user device 310 can send a request 312A to create an account 303 via the website of a service provider 330. A computer system 332 associated with the service provider 330 receives the request 312A and sends an API call 314A to a computer system 320 of another service provider 340 with an account identifier. The computer system 320 can generate the account 303 based on the API call 314A. The computer system 320 stores account information 322 for the account 303, which can include the account identifier, an association of the user device 310 and a device identifier, and other suitable information about the account 303.

In an example, the profile creation stage 302 involves creating one or more profiles for the account 303. The user may use the user device 310 to send a request 312B for creating a profile 304 via the website of the service provider 330. The request 312B may be the same or different request as request 312A. The request 312B can include a default profile for the account 303 or profile identifiers for one or more profiles of the account 303. The computer system 332 receives the request 312B and sends an API call 314B to the computer system 320. The computer system 320 generates the profile 304 based on the API call 314B. For instance, the computer system 320 can set the profile 304 as the default profile. The computer system 320 can also store profile information 324 for the profile 304 that includes first profile information associated with the service provider 340 and second profile information associated with the service provider 330, subscription information of a subscription of the user with the service provider 330, and/or information of another account of the user with the service provider 330. The API call 314B may indicate multiple users associated with the account 303 based on the request 312B, and the computer system 320 can generate a profile and associated profile information for each user of the account 303.

The profile creation stage 302 can also involve the computer system 320 storing access control information 326 for controlling access to the account information 322 and the profile information 324. The access control information 326 may be provided by the user via the user device 310, by the service provider 340, or by another entity. So, upon the service provider 330 requesting information about the account 303 or the profile 304, the computer system 320 can check the access control information 326 to determine whether the service provider 330 has permission to access the account 303 or the profile 304.

Figure 4:
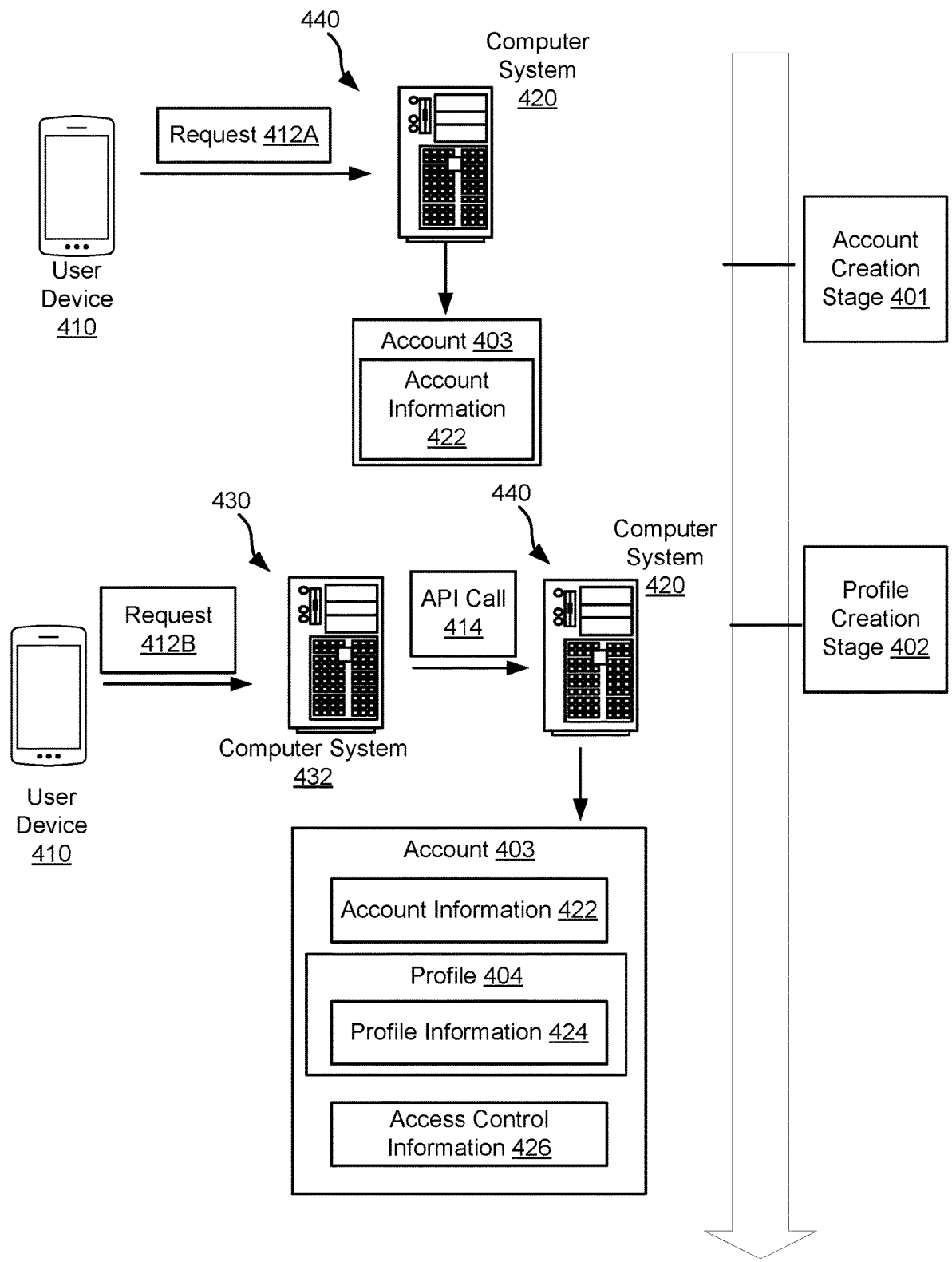
FIG. 4 illustrates an example of stages of creating an account and profiles via a first service provider and a second service provider according to an embodiment of the present disclosure.

FIG. 4 illustrates an example of stages of creating an account and profiles via a first service provider and a second service provider according to an embodiment of the present disclosure. In an example, the stages include an account creation stage 401 and a profile creation stage 402.

During the account creation stage 401, a user can use a user device 410 to access a website associated with a service provider 440. The user device 410 can send a request 412A to create an account 403 to a computer system 420 associated with the service provider 440. In response, the computer system 420 can generate the account 403. The computer system 420 stores account information 422 for the account 403, which can include an account identifier, an association of the user device 410 and a device identifier, and other suitable information about the account 403.

In an example, the profile creation stage 402 involves creating one or more profiles for the account 403. The user may use the user device 410 to send a request 412B for creating a profile 404 via a website of a service provider 430, which is a different service provider than the service provider 440. The request 412B can include a default profile for the account 403 or profile identifiers for one or more profiles of the account 403. The computer system 432 receives the request 412B and sends an API call 414 to the computer system 420. The computer system 420 generates the profile 404 based on the API call 414. For instance, the computer system 420 can set the profile 404 as the default profile. The computer system 420 can also store profile information 424 for the profile 404 that includes first profile information associated with the service provider 440 and second profile information associated with the service provider 430, subscription information of a subscription of the user with the service provider 430, and/or information of another account of the user with the service provider 430. The API call 414 may indicate multiple users are associated with the account 403 (e.g., a household of users sharing an account) based on the request 412B, and the computer system 420 can generate a profile and associated profile information for each user of the account 403.

The profile creation stage 402 can also involve the computer system 420 storing access control information 426 for controlling access to the account information 422 and the profile information 424. The access control information 426 may be provided by the user via the user device 410, by the service provider 440, or by another entity. So, upon the service provider 430 requesting information about the account 403 or the profile 404, the computer system 420 can check the access control information 426 to determine whether the service provider 430 has permission to access the account 403 or the profile 404.

Figure 5:
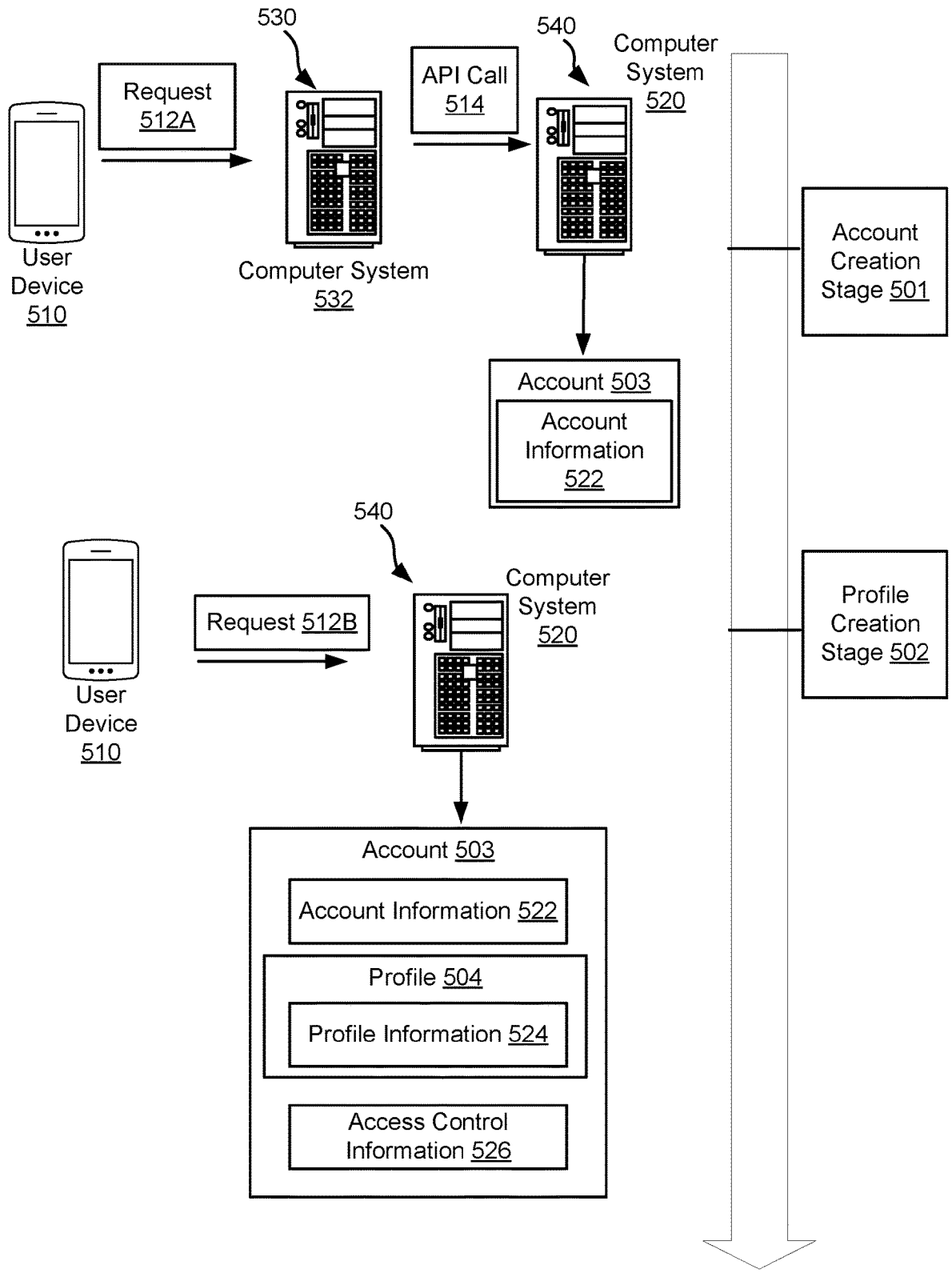
FIG. 5 illustrates another example of stages of creating an account and profiles via a first service provider and a second service provider according to an embodiment of the present disclosure.

FIG. 5 illustrates another example of stages of creating an account and profiles via a first service provider and a second service provider according to an embodiment of the present disclosure. In an example, the stages include an account creation stage 501 and a profile creation stage 502.

During the account creation stage 501, a user can use a user device 510 to access a website associated with a service provider 530. The user device 510 can send a request 512A to create an account 503 via the website of a service provider 530. A computer system 532 associated with the service provider 530 receives the request 512A and sends an API call 514 to a computer system 520 of another service provider 540 with an account identifier. The computer system 520 can generate the account 503 based on the API call 514. The computer system 520 stores account information 522 for the account 503, which can include the account identifier, an association of the user device 510 and a device identifier, and other suitable information about the account 503.

In an example, the profile creation stage 502 involves creating one or more profiles for the account 503. The user may use the user device 510 to create the one or more profiles. For instance, the user device 510 may send a request 512B for creating a profile 504 via a website of the service provider 540. The computer system 520 generates the profile 504 based on the request 512B. The computer system 520 can store profile information 524 for the profile 504 that includes first profile information associated with the service provider 540 and second profile information associated with the service provider 530, subscription information of a subscription of the user with the service provider 530, and/or information of another account of the user with the service provider 530. The user device 510 may indicate multiple users associated with the account 503, and the computer system 520 can generate a profile and associated profile information for each user of the account 503.

The profile creation stage 502 can also involve the computer system 520 storing access control information 526 for controlling access to the account information 522 and the profile information 524. The access control information 526 may be provided by the user via the user device 510, by the service provider 540, or by another entity. So, upon another service provider requesting information about the account 503 or the profile 504, the computer system 520 can check the access control information 526 to determine whether the other service provider has permission to access the account 503 or the profile 504.

Figure 6:
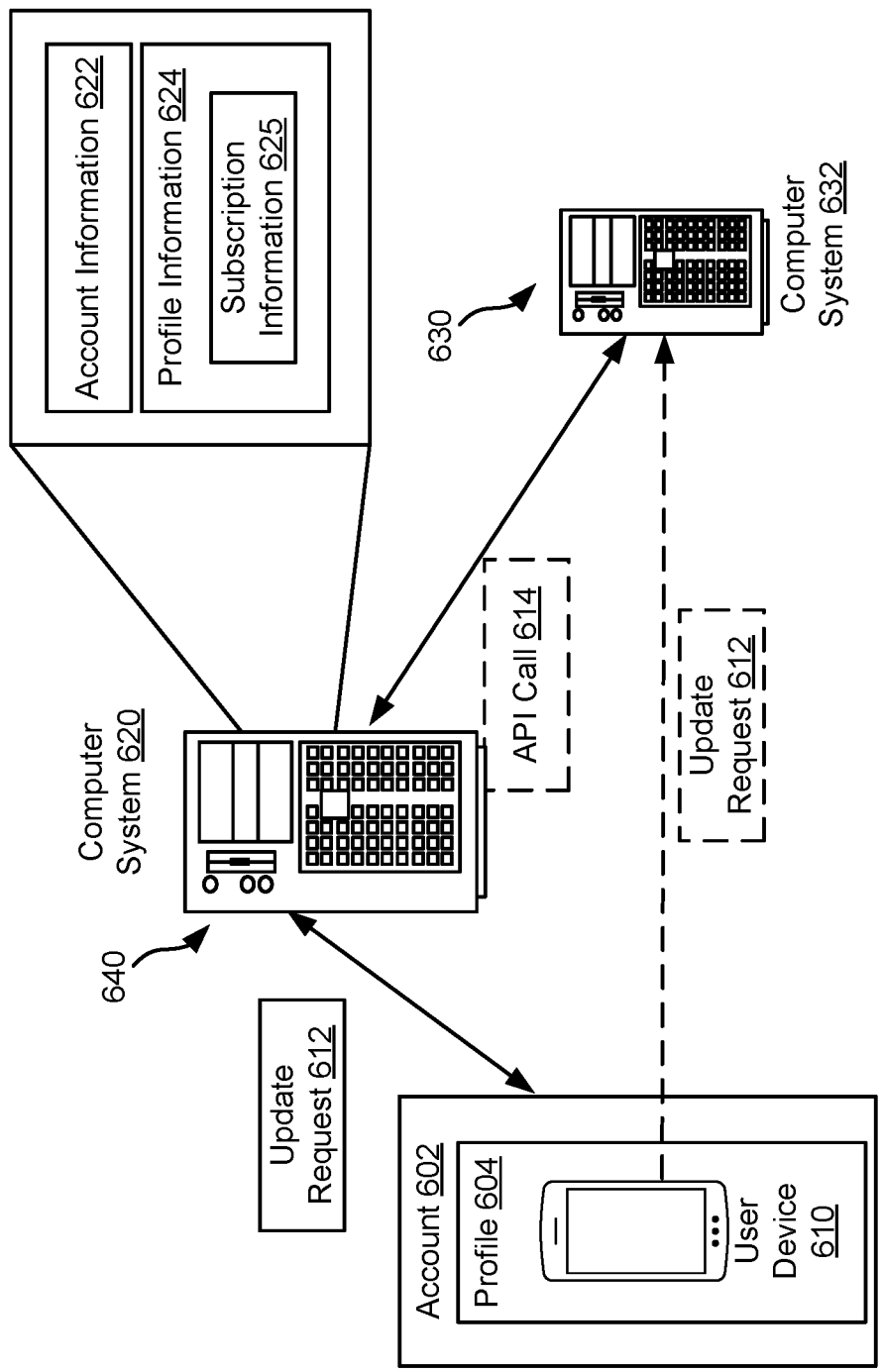
FIG. 6 illustrates an example of updating profile information for an account according to an embodiment of the present disclosure.

FIG. 6 illustrates an example of updating profile information 624 for an account 602 according to an embodiment of the present disclosure. In an example, a computer system 620 associated with a service provider 640 stores account information 622 for the account 602, which includes at least one profile 604. The computer system 620 also stores profile information 624 for the profile 604, and the profile information 624 includes subscription information 625 of a subscription of a user of the account 602 with a service provider 630.

At some point in time, the computer system 620 can receive an update request 612 to update the profile information 624 for the account 602. For example, a user device 610 of the user can send the update request 612 to the computer system 620, in which the update request 612 is a request to update the subscription (or another feature of the account 602). Alternatively, the user device 610 may send the update request 612 to a computer system 632 associated with the service provider 630, and the computer system 632 can send an API call 614 to the computer system 620 to update the subscription. In either case, the computer system 620 receives the indication to update the subscription and updates the profile information 624 by at least changing the subscription information 625. For instance, the update request 612 may indicate that the subscription is to be removed from the profile 604, so the subscription information 625 can be updated to remove the subscription. Or, the update request 612 may indicate that a subscription level of the subscription is to be changed and the computer system 620 can update the subscription information 625 to change the subscription level. If the update request 612 is received from the user device 610, once the profile information 624 is updated, the computer system can determine that the updated profile information is associated with a subscription of the user with the service provider 630. The computer system 620 then sends the updated profile information (e.g., the updated subscription information) to the computer system 632.

Figure 7:
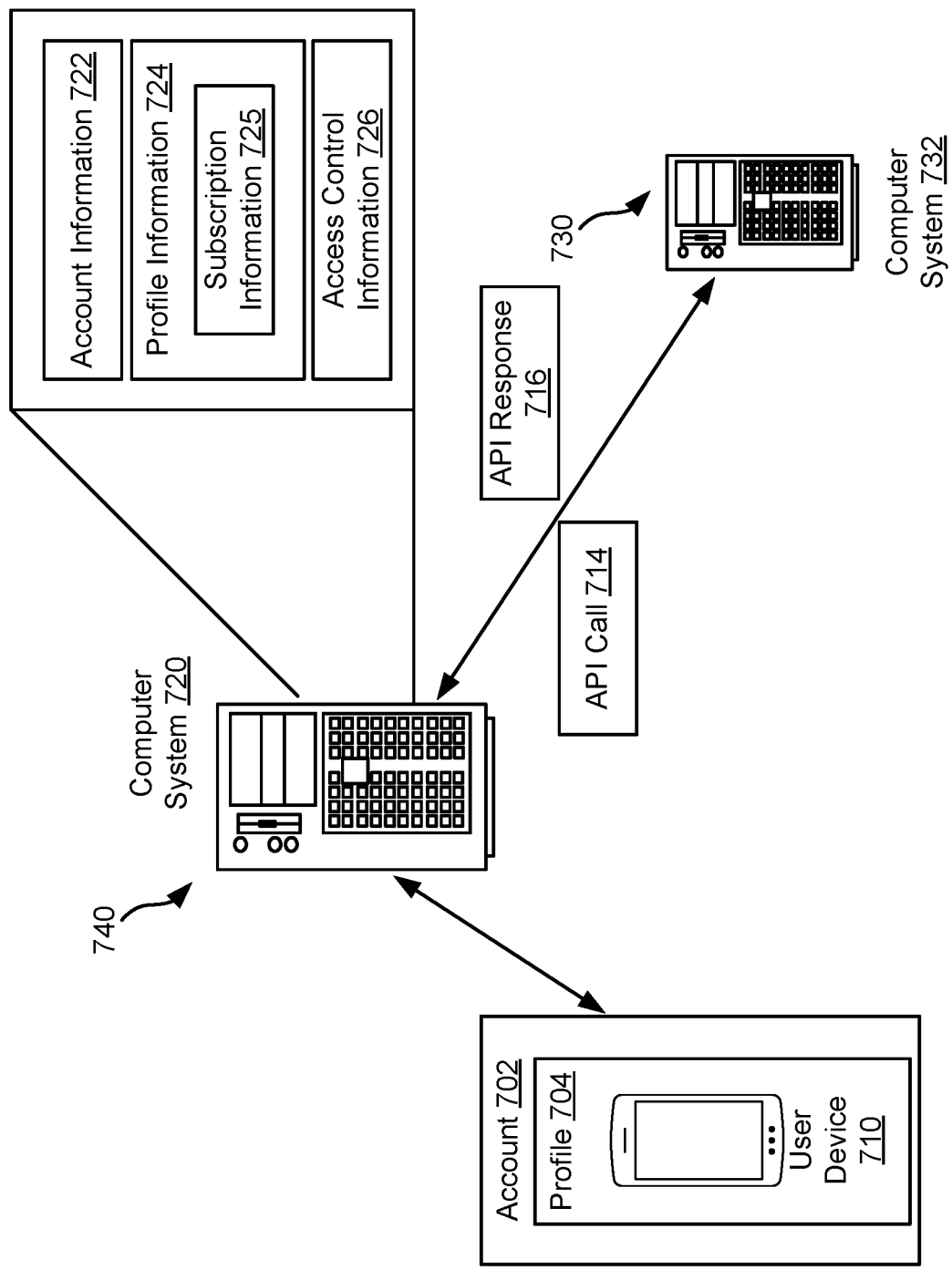
FIG. 7 illustrates an example of sharing profile information between service providers according to an embodiment of the present disclosure.

FIG. 7 illustrates an example of sharing profile information between service providers according to an embodiment of the present disclosure. In an example, a computer system 720 associated with a service provider 740 stores account information 722 for an account 702, which includes at least one profile 704. The computer system 720 also stores profile information 724 for the profile 704, and the profile information 724 includes subscription information 725 of a subscription of a user of the account 702 with a service provider 730.

The computer system 720 can receive an information request of the computer system 732 via an API call 714. The information request can indicate the account 702 and/or the profile 704. For example, the information request can include verification information that is usable to verify that the information request is valid. Generally, the verification information can represent data known to or derivable by the computer system 720 to allow the validation. Different types of verification information are possible. In one example, verification information is associated with the account 702 (e.g., an account identifier, a hash of the account identifier, random information encrypted with a public encryption key associated with the account 702, etc.). The computer system 720 verifies the verification information (e.g., by matching account identifiers, hashes, successful decryption, etc.) and analyses the access control information 726 to determine whether the service provider 730 has permission to access some or all of the account information 722. In another example, the information request can alternatively or also include verification information associated with a profile of the account (e.g., a profile identifier, a hash, encrypted information) for the profile 704. The computer system 720 verifies the verification information and analyses the access control information 726 to determine whether the service provider 730 has permission to access some or all of the profile information 724. The account 702 can be a superset of all of the profiles, so verification at the account level can occur before verification at the profile level. In some examples, it may be sufficient to verify the verification information at the account level to then use the access control information. In other examples, verification at both levels may be needed.

In one example, the verification information (at the account level and/or the profile level) can be specific to a service provider 730 and mapped to the account information 722 and/or the profile information 724. For example, the verification information includes an identifier(s) of the account 702 and/or the profile within the account, where the identifier(s) can be specified by the service provider 730. The computer system 720 can store a mapping of the identifier(s) to the account information 722 and/or the profile information 724. Upon receiving the verification information, the computer system 720 uses the identifier(s) to look-up the mapping and determine a match with the account information 722 and/or the profile information 724. The match indicates that the information request is verified.

In addition to storing the mapping, the computer system 702 can store a property associated with the identifier(s) and indicating whether a credential (e.g., a pin, a token, etc.) is needed for the verification. In such a situation, the computer system 702 can also store a copy of the credential (or some other form of information to verify the credential). The information request can include the credential. Upon determining the match between the identifier(s) and the account information 722 and/or the profile information 724, the computer system 702 can determine, based on the property, that the credential is to be verified and can compare the credential to the stored copy. Upon a credential match, the computer system 702 determines that the information request is verified.

The access control information 726 can include access permissions between the account and between profiles. That is, a first profile may have permission to access profile information about a second profile, but the second profile may not have permission to access profile information about the first profile. In an example, the access control information 726 may indicate that particular metadata is sharable for the user with the service provider 730. In this case, the computer system 720 can send the profile information 724 including the particular metadata via an API response 716 with at least a portion of the profile information 724 to the computer system 732. In addition, if the profile information 724 includes information associated with multiple profiles, the access control information 726 can indicate that first metadata for a first profile (e.g., profile 704) is sharable with the service provider 730 and that second metadata for a second profile is not sharable with the service provider 730, so the API response 716 can include the first metadata and not the second metadata. In another example, the profile information 724 can include first profile information associated with the service provider 740 and second profile information associated with the service provider 730. Upon determining that the access control information 726 permits the second profile information to be shared with the service provider 730, the computer system 720 can include the second profile information and not the first profile information in the API response 716.

In an example, the access control information 726 may permit an account name of the account 702 and a profile name of the profile 704 to be shared with the service provider 730. So, the computer system 720 includes the account name and the profile name in the API response 716. In this way, a structure of the account 702 for the service provider 740 can be mirrored for the service provider 730. The profile information 724 may include first profile information unassociated with the service provider 730 and second profile information associated with the service provider 730, and, in this case, the computer system 720 can include the second profile information and not the first profile information in the API response 716.

The computer system 720 may additionally or alternatively determine historical information about interactions with one or more services of the service provider 740 by a user device 710 associated with the account 702 or the profile 704. For instance, the historical information may indicate that a user of the account frequently watches a particular genre of movies. The access control information 726 can permit the historical information to be shared with the service provider 730, so the computer system 720 can include the historical information in the API response 716. The historical information may be usable by the service provider 730 to customize content and recommendations for the user.

Figure 8:
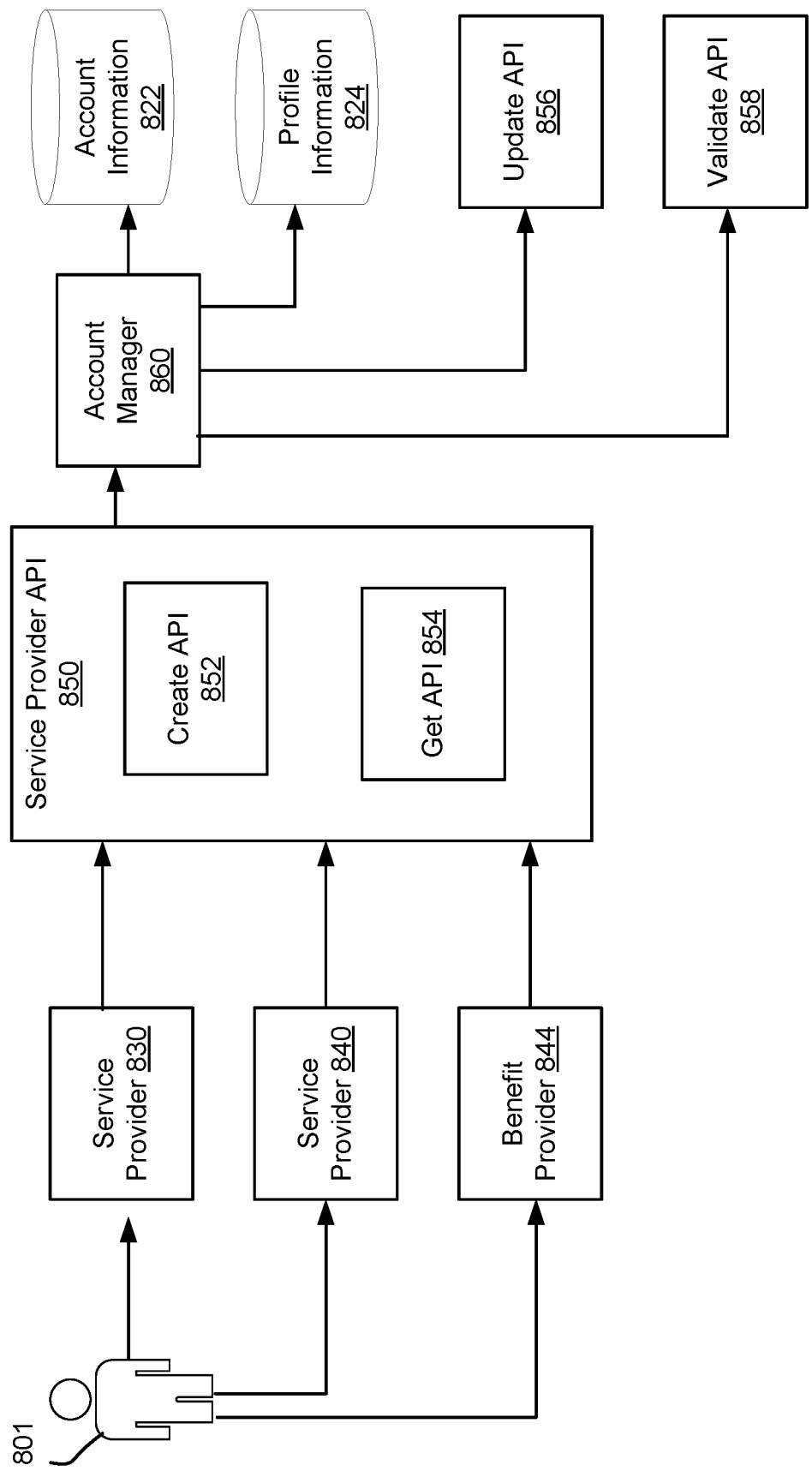
FIG. 8 illustrates an example architecture for providing profiles as a service according to an embodiment of the present disclosure.

FIG. 8 illustrates an example architecture for providing profiles as a service according to an embodiment of the present disclosure. A user 801 can communicate with one or more service providers (e.g., service provider 830 and service provider 840) and a third party provider 844. The third party provider 844 may provide one or more services related to the service provider 840. For instance, the third party provider 844 can provide benefits to a subscription associated with the service provide 840. The user 801 can access the service provider 830 to create a new account or access the service provider 840 or the benefits provider 844 to use a previously-created account of the service provider 830 with the service provider 840.

In an example, a request to the service provider 830 to create an account is sent from the service provider 830 to a create API 852 of a service provider API 850. The create API 852 can then communicate with an account manager 860 to store account information 822 and profile information 824 for the account. A request to share profile information with the service provider 840 from the service provider 830 can be sent from the service provider 840 to a Get API 854 of the service provider API 850. The Get API 854 can communicate with the account manager 860, which can analyze access control information 826 to determine whether the profile information can be shared with the service provider 840. In addition, a request to validate a subscription of the service provider 840 can be received by the Get API 854. An API call may be generated by the third party provider 844 in response to a request of the user 801 to use the subscription. The profile information 824 can include subscription information, which can be used by the account manager 860, along with a validate API 858 to validate the subscription. In response to validating the subscription, the service provider 840 can send an indication that the subscription is valid to the third party provider 844. Another request that can be received from the user 801 is a request to update the account, either by adding a profile, removing a profile, adding a subscription, or removing a subscription. The request can be received by the create API 852 or the Get API 854 and the account manager 860, along with an update API 858, can then update the profile information 824 based on the request.

Figure 9:
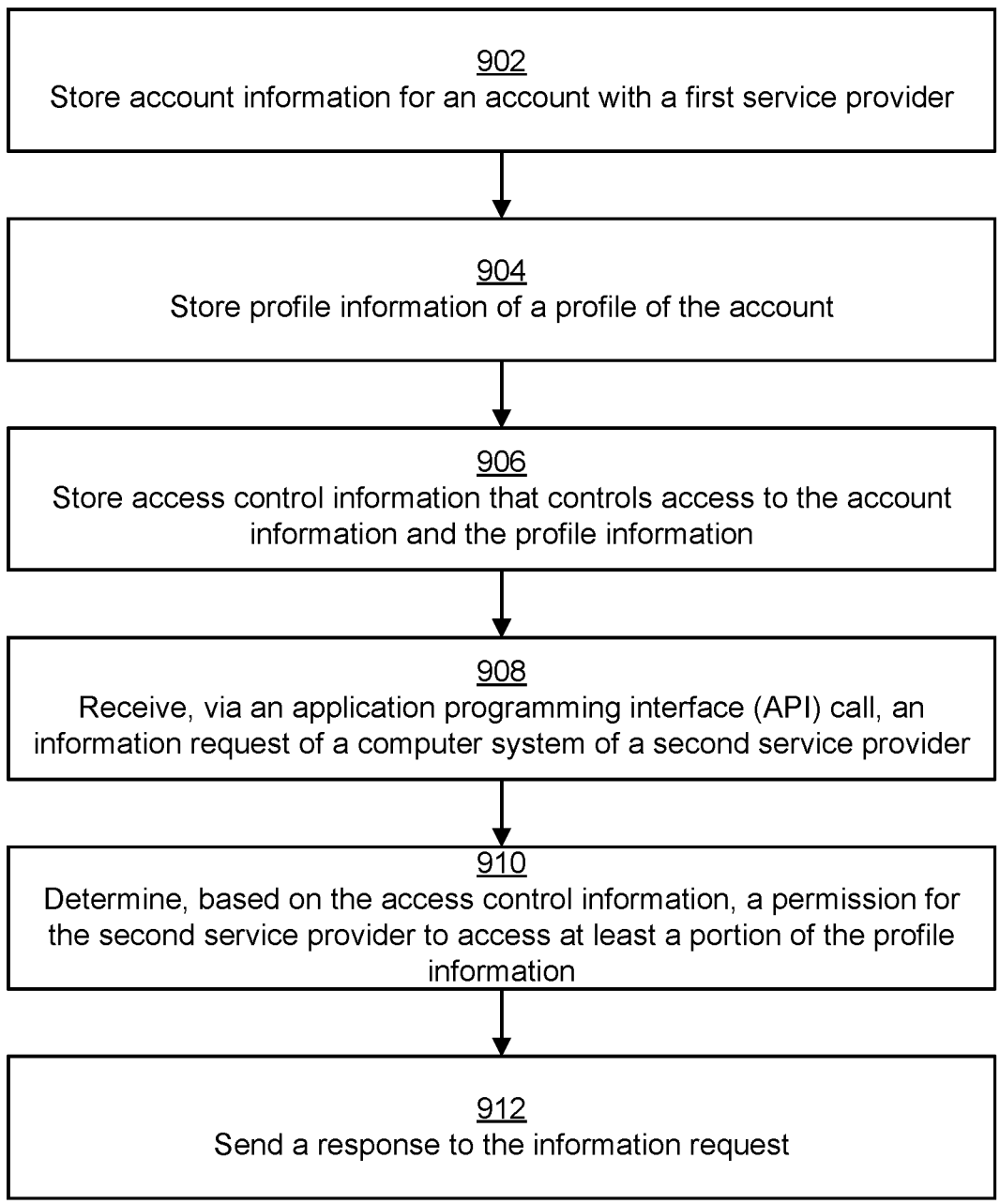
FIG. 9 illustrates an example of a flow for a providing profiles as a service, according to an embodiment of the present disclosure.
Figure 10:
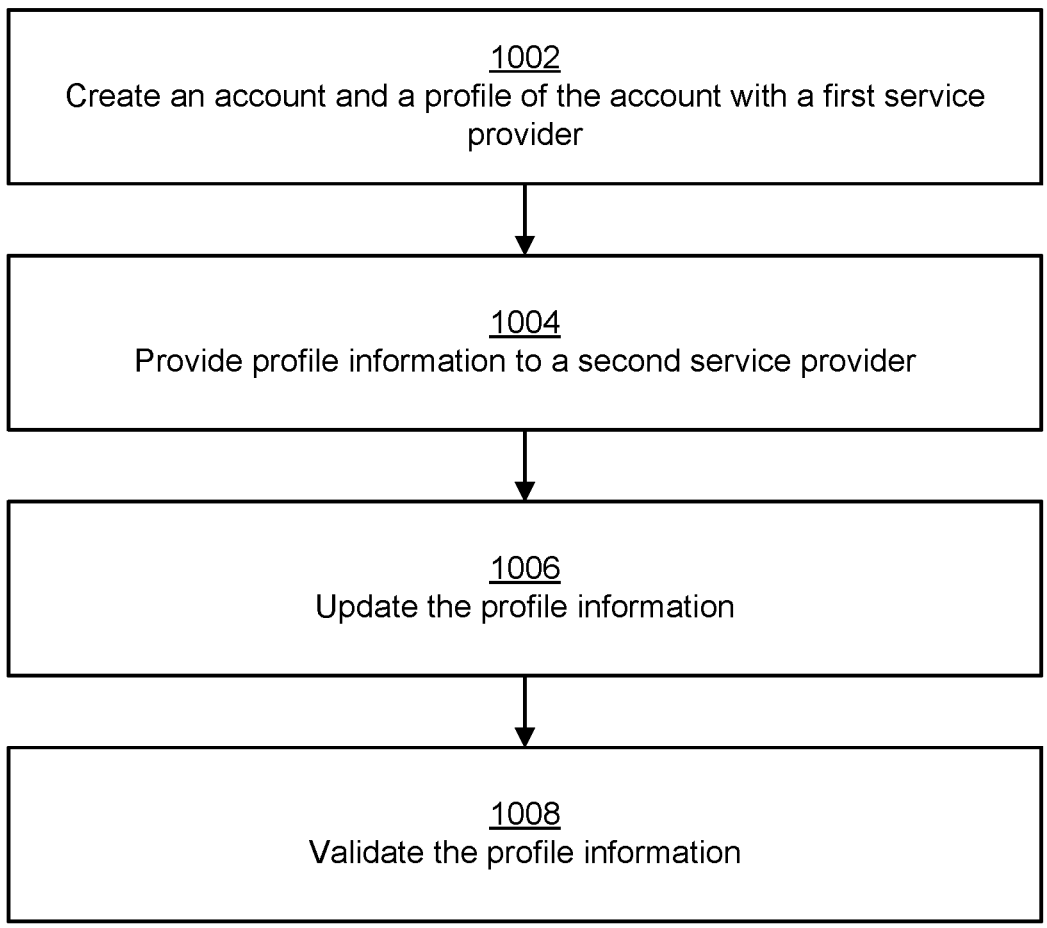
FIG. 10 illustrates an example of a flow for a process of creating, sharing, updating, and validating profiles across service providers.

FIGS. 9-10 illustrate example flows of processes for providing profiles as a service, according to an embodiment of the present disclosure. Some or all of the processes (or any other processes described herein, or variations, and/or combinations thereof) may be performed under the control of one or more computer systems, such as the computer system 120 in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 9 illustrates an example of a flow for a providing profiles as a service, according to an embodiment of the present disclosure. In an example, the flow includes operation 902, where the computer system stores account information for an account with a first service provider. The computer system is part of the first service provider. The account can include multiple profiles. For example, the account may be associated with multiple users, and each user can be associated with a profile. The account information can include an account name, or another identifier of the account. The account can be created in response to a request from a user, either from a user device or from an API call from a computer system of a second service provider.

In an example, the flow includes operation 904, where the computer system stores profile information of a profile of the account. The profile information can include a profile name, subscription information, or other information associated with the first service provider or the second service provider for the account.

In an example, the flow includes operation 906, where the computer system stores access control information that controls access to the account information and the profile information. The access control information can indicate which portions of the account information and the profile information are sharable with the second service provider. For instance, the account name and the profile name may be sharable. In addition, the access control information may include different permissions for the account information and the profile information and for different profiles of the account.

In an example, the flow includes operation 908, where the computer system receives, via an API call, an information request of a second computer system of the second service provider. The information request can indicate the profile for which the information is being requested. For example, the information request may be for subscription information or historical information associated with the profile of the account.

In an example, the flow includes operation 910, where the computer system determines, based on the access control information, a permission for the second service provider to access at least a portion of the profile information. The computer system can analyze the access control information to determine that the second service provider has permission to access the subscription information and/or the historical information.

In an example, the flow includes operation 912, where the computer system sends a response to the information request. The response is sent to the second computer system via an API response and includes the portion of the profile information that the second service provider has permission to access (e.g., the subscription information and/or the historical information).

FIG. 10 illustrates an example of a flow for a process of creating, sharing, updating, and validating profiles across service providers. In an example, the flow includes operation 1002, where the computer system creates an account and a profile of the account with a first service provider. The computer system is a first computer system of a first service provider. To create the account, the computer system may receive a first API call from a second computer system of a second service provider including an account identifier of the account and a default profile. The first API call can be received based on the second computing system receiving a request from a computing device of a user associated with the account for an account creation. The computer system can then generate the account based on the first API call by storing the account identifier and setting the profile as the default profile.

In an example, the flow includes operation 1004, where the computer system provides profile information to a second service provider. The computer system can receive, via a second API call, an information request of the second computer system of the second service provider. The information request indicates the profile. The computer system can then determine whether the second service provider has permission to access profile information of the profile based on access control information for the account and the profile. Upon determining that the second service provider has permission to access the profile information, the computer system sends a response to the information request via an API response to the second computer system, where the response includes the profile information.

In an example, the flow includes operation 1006, where the computer system updates the profile information. The profile information can include subscription information of a subscription of the user with the second service provider. The computer system can receive a third API call from the second computer system to update the subscription (e.g., to remove or change the subscription). The third API call can be received based on a request received by the second computer system from the computing device of the user to update the subscription. The computer system can then update the profile information by at least changing the subscription information based on the third API call.

In an example, the flow includes operation 1008, where the computer system validates the profile information. The computer system can receive a fourth API call from the second computer system to validate the subscription. The fourth API call can be received based on a request received by the second computer system from the computing device of the user to use the subscription. The computer system can then validate the subscription based on the profile information and send an indication to the second computer system that the subscription is valid.

Storage and/or use of information related to a particular person or device may be controlled by a user using privacy controls associated with a speech-controlled device and/or a companion application associated with a speech-controlled device. Accordingly, users may opt out of storage of information and/or may select particular types of information that may be stored while preventing aggregation and storage of other types of information. Additionally, aggregation, storage, and use of information, as described herein, may be compliant with privacy controls, even if not technically subject to them, to bolster user trust. For example, information described herein may be treated as if it fell under acts and regulations, such as the Health Insurance Portability and Accountability Act (HIPAA) and the General Data Protection Regulation (GDPR), even if it does not actually fall under these acts and regulations.

Figure 11:
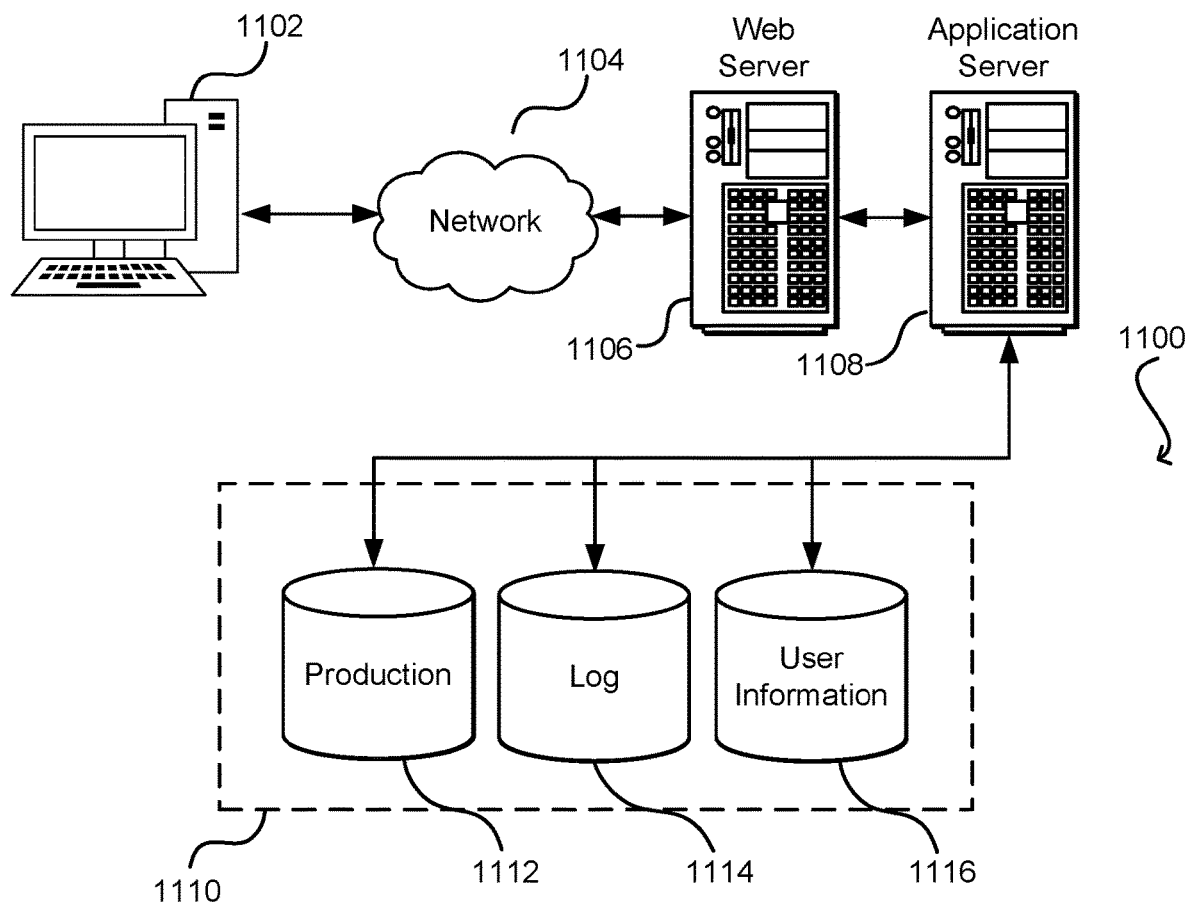
FIG. 11 illustrates aspects of an example environment for implementing aspects in accordance with various embodiments.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Computer-readable storage media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A first computer system of a first service provider, the first computer system comprising:
    one or more processors; and
    one or more memory storing instructions that, upon execution by the one or more processors, configure the first computer system to:
        store account information for an account of a user with the first service provider, the account configured to include a plurality of profiles;
        store profile information of a profile of the account, the profile information including subscription information of the user, the subscription information corresponding to a subscription of the user with a second service provider;
        store access control information that controls access to the account information and the profile information;
        receive, via a first application programming interface (API) call, an information request of a second computer system of the second service provider, the information request indicating the profile;
        determining, based at least in part on the access control information, a permission for the second service provider to access at least a portion of the profile information;
        send, to the second computer system via a first API response, a response to the information request, the response including the portion of the profile information;
        validate the subscription of the user with the second service provider based at least in part on the subscription information; and
        send an indication to the second computer system that the subscription is valid.

2. The first computer system of claim 1, wherein the one or more memory store further instructions that, upon execution by the one or more processors, configure the first computer system to:
    receive, prior to receiving the first API call, a second API call from the second computer system including an account identifier of the account and a default profile, the second API call received based at least in part on a request received by the second computer system from a computing device of the user for an account creation; and
    generate the account based at least in part on the second API call by at least storing the account identifier and setting the profile as the default profile.

3. The first computer system of claim 1, wherein the one or more memory store further instructions that, upon execution by the one or more processors, configure the first computer system to:
    receive, after receiving the first API call, a second API call from the second computer system to update the subscription, the second API call received based at least in part on a request received by the second computer system from a computing device of the user to update the subscription; and
    update the profile information by at least changing the subscription information based at least in part on the second API call.

4. The first computer system of claim 1, wherein the one or more memory store further instructions that, upon execution by the one or more processors, configure the first computer system to:
    receive, after receiving the first API call, a second API call from the second computer system to validate the subscription, the second API call received based at least in part on a request received by the second computer system from a computing device of the user to use the subscription, wherein the subscription is validated in response to the second API call.

5. A method implemented by a computer system, the method comprising:
    storing account information for an account with a first service provider and profile information of a profile of the account;
    associating first metadata of the account or the profile with a first access control permission;
    associating second metadata of the profile with a second access control permission;
    storing access control information that controls access to the account information and the profile information, the access control information indicating the first access control permission at an account level and the second access control permission at a profile level;
    receiving an information request of a second service provider, the information request including verification information associated with at least one of the account or the profile;
    determining, based at least in part on the access control information and the verification information, a permission for the second service provider to access at least a portion of the profile information, the access control information indicating the second access control permission for the second service provider; and
    sending, to the second service provider, the portion of the profile information in a response to the information request, the portion of the profile including the second metadata.

6. The method of claim 5, wherein the profile information includes first profile information associated with the first service provider and second profile information associated with the second service provider, and wherein the method comprises:
   determining that the access control information permits the second profile information to be shared with the second service provider; and
   including the second profile information and not the first profile information in the portion of the profile information sent to the second service provider.

7. The method of claim 5, further comprising:
   determining that the access control information permits an account name of the account and a profile name of the profile to be shared with the second service provider; and
   including the account name and the profile name in the portion of the profile information sent to the second service provider.

8. The method of claim 7, wherein the profile information includes first profile information unassociated with the second service provider and second profile information associated with the second service provider, and wherein the method comprises:
   including the second profile information and not the first profile information in the portion of the profile information sent to the second service provider.

9. The method of claim 5, further comprising:
   determining historical information about interactions with one or more services of the first service provider by one or more computing devices associated with the account or the profile;
   determining that the access control information permits the historical information to be shared with the second service provider; and
      including the historical information in the portion of the profile information sent to the second service provider.

10. The method of claim 5, wherein the account is associated with a user, and wherein the method further comprises:
    receiving, from the second service provider, an application programming interface (API) call requesting creation of at least one of the account or the profile, the API call received based at least in part on a request received by the second service provider from a computing device of the user; and
       generating at least one of the account or the profile based at least in part on the API call.

11. The method of claim 5, wherein the account is associated with a user, and wherein the method further comprises:
    receiving, from a computing device of the user, a request to update the profile information;
    storing updated profile information for the profile;
    determining that the updated profile information is associated with a subscription of the user with the second service provider; and
       sending, to the second service provider, the updated profile information.

12. The method of claim 5, wherein the account is associated with a user, and wherein the method further comprises:
    receiving, from a computing device of the user, a first request to create the account;
    generating the account based at least in part on the first request;
    receiving, from the second service provider, a second request to create the profile, the second request received based at least in part on a third request received by the second service provider from the computing device of the user or from a different computing device of the user; and
       generating the profile based at least in part on the second request.

13. One or more non-transitory computer-readable storage media storing instructions that, upon execution by a computer system, cause the computer system to perform operations comprising:
    storing account information for an account of a user with a first service provider and profile information of a profile of the account, the profile information including subscription information of the user, the subscription information corresponding to a subscription of the user with a second service provider;
    storing access control information that controls access to the account information and the profile information;
    receiving an information request of the second service provider, the information request including verification information associated with at least one of the account or the profile;
    determining, based at least in part on the access control information and the verification information, a permission for the second service provider to access at least a portion of the profile information;
    sending, to the second service provider, the portion of the profile information in a response to the information request;
    validating the subscription of the user with the second service provider based at least in part on the subscription information; and
    sending an indication to the second service provider that the subscription is valid.

14. The one or more non-transitory computer-readable storage media of claim 13, wherein the access control information indicates that particular metadata is sharable for the user with the second service provider, and wherein the portion of the profile information sent to the second service provider includes the particular metadata.

15. The one or more non-transitory computer-readable storage media of claim 13, wherein the profile and the profile information are a first profile and first profile information, respectively, wherein the operations further comprise:
    storing second profile information of a second profile of the account, wherein the access control information indicates that first metadata of the first profile is sharable with the second service provider and that second metadata information of the second profile is not sharable with the second service provider.

16. The one or more non-transitory computer-readable storage media of claim 13, wherein the operations further comprise:
    associating first metadata of the account or the profile with a first access control permission;
    associating second metadata of the profile with a second access control permission;
    determining that the access control information indicates the second access control permission for the second service provider; and
    including, based at least in part on the second access control permission, the second metadata and not the first metadata in the portion of the profile information sent to the second service provider.

17. The one or more non-transitory computer-readable storage media of claim 13, wherein the access control information indicates a first access control permission at an account level and a second access control permission at a profile level, and wherein the portion of the profile information sent to the second service provider is based at least in part on the second access control permission.

18. The one or more non-transitory computer-readable storage media of claim 13, wherein the portion of the profile information sent to the second service provider includes the subscription information.

19. The one or more non-transitory computer-readable storage media of claim 13, wherein the profile information includes second information for a second account of the user with the second service provider, and wherein the portion of the profile information sent to the second service provider includes the second information.

20. The one or more non-transitory computer-readable storage media of claim 13, wherein the profile information is associated with a service of the second service provider for the user, and wherein the operations further comprise:
- receiving, from a third computer system of a third service provider a request for the profile information;
- determining that the access control information permits the portion of the profile information to be shared with the third service provider; and
- sending the portion of the profile information to the third computer system.

\* \* \* \* \*